United States Patent
Chen et al.

(10) Patent No.: US 9,967,938 B2
(45) Date of Patent: May 8, 2018

(54) SOLID STATE LIGHT SOURCE DEVICE AND DIMMING CIRCUIT THEREOF

(71) Applicant: Lextar Electronics Corporation, Hsinchu (TW)

(72) Inventors: Po-Shen Chen, Hsinchu (TW); Chun-Jong Chang, Zhubei (TW); Chien-Nan Yeh, Kaohsiung (TW)

(73) Assignee: Lextar Electronics Corporation (TW)

(*) Notice: Subject to any disclaimer, the term of this patent is extended or adjusted under 35 U.S.C. 154(b) by 395 days.

(21) Appl. No.: 14/740,766

(22) Filed: Jun. 16, 2015

(65) Prior Publication Data
US 2016/0119994 A1   Apr. 28, 2016

(30) Foreign Application Priority Data

Oct. 23, 2014   (TW) .............. 103136670 A

(51) Int. Cl.
*H05B 33/08* (2006.01)
*H02J 1/00* (2006.01)
*H02M 5/297* (2006.01)

(52) U.S. Cl.
CPC ............ *H05B 33/0851* (2013.01); *H02J 1/00* (2013.01); *H02M 5/297* (2013.01); *H05B 33/0818* (2013.01); *Y02B 20/346* (2013.01)

(58) Field of Classification Search
CPC .................................................. H05B 33/0851
USPC ........................................................... 307/31
See application file for complete search history.

(56) References Cited

U.S. PATENT DOCUMENTS

| 8,258,710 B2 | 9/2012 | Alexandrovich et al. |
| 8,736,190 B2 * | 5/2014 | Kotowski ........... H02M 1/4225 315/185 S |

FOREIGN PATENT DOCUMENTS

| CN | 103259426 A | 8/2013 |
| TW | 496104 B | 7/2002 |
| TW | 201204164 A | 1/2012 |
| TW | M452311 | 5/2013 |

* cited by examiner

*Primary Examiner* — Joseph Chang
(74) *Attorney, Agent, or Firm* — Hayes Soloway PC

(57) ABSTRACT

A solid state light source device and a dimming circuit are provided. The dimming circuit includes a rectifier circuit, a switch unit, and a control unit. The rectifier circuit is configured to convert an AC voltage signal to a rectified voltage signal. The switch unit is electrically connected between the rectifier circuit and a lighting module and configured to undergo switching according to a pulse width modulation signal to connect or disconnect the rectifier circuit and the lighting module. The control unit is electrically connected to the switch unit and configured to generate the pulse width modulation signal to control the switch unit.

7 Claims, 6 Drawing Sheets understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

SOLID STATE LIGHT SOURCE DEVICE AND DIMMING CIRCUIT THEREOF

RELATED APPLICATIONS

This application claims priority to Taiwanese Application Serial Number 103136670, filed Oct. 23, 2014, which is herein incorporated by reference.

BACKGROUND

Technical Field

The present disclosure relates to a dimming circuit and a solid state light source device, and in particular, to a dimming circuit and a solid state light source device, in which the dimming circuit is able to adjust the light emission of the solid state light source device.

Description of Related Art

In recent times, due to the advantages of the light emitting diode (LED), such as high efficiency and ability to save energy, the light emitting diode has replaced the traditional light source in many applications and has become an important area of research.

However, if the present LED driving circuit is configured to achieve a dimming function, a capacitor must be additionally installed in the driving circuit to limit the current, thus lowering the power factor, which may not be in compliance with the regulations of each country. In addition, extra modification of the driving circuit is needed for different products, and this will lead to lack modularization design and the design of circuit control will become complicated and costly. Therefore, ways in which to modularize the circuitry used for dimming LEDs and to improve the power factor of the system are important areas of research in the field.

SUMMARY

To solve the problem stated above, one aspect of the present disclosure is a dimming circuit configured to dim a lighting module. The dimming circuit includes a rectifier circuit, a switch unit and a control unit. The rectifier circuit is configured to convert an AC voltage signal to a rectified voltage signal. The switch unit is electrically connected between the rectifier circuit and the lighting module and configured to undergo switching according to a pulse width modulation (PWM) signal to connect or disconnect the rectifier circuit and the lighting module. The control unit is electrically connected to the switch unit and configured to generate the pulse width modulation signal to control the switch unit.

Another aspect of the present invention is a solid state light source device. The solid state light source device includes a lighting module, a rectifier circuit, a switch unit and a control unit. The rectifier circuit is configured to convert an AC voltage signal to a rectified voltage signal. The switch unit is electrically connected between the rectifier circuit and the lighting module and is configured to undergo switching according to a pulse width modulation signal to connect or disconnect the rectifier circuit and the lighting module. The control unit is electrically connected to the switch unit and is configured to generate the pulse width modulation signal to control the switch unit.

In summary, in the present disclosure, by adjusting the duty cycle of the pulse width modulation signal to selectively connect or disconnect the rectifier circuit and the lighting module, the terminal voltage of the lighting module that the rectified voltage signal is conducted to is regulated, in order to achieve a dimming function. Accordingly, no capacitor is needed to limit the current, such that the power factor of the system may be improved, and the dimming circuit may be applied to various lighting modules to thereby achieve a modularization design in order to simplify circuit control and reduce the costs associated with development.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
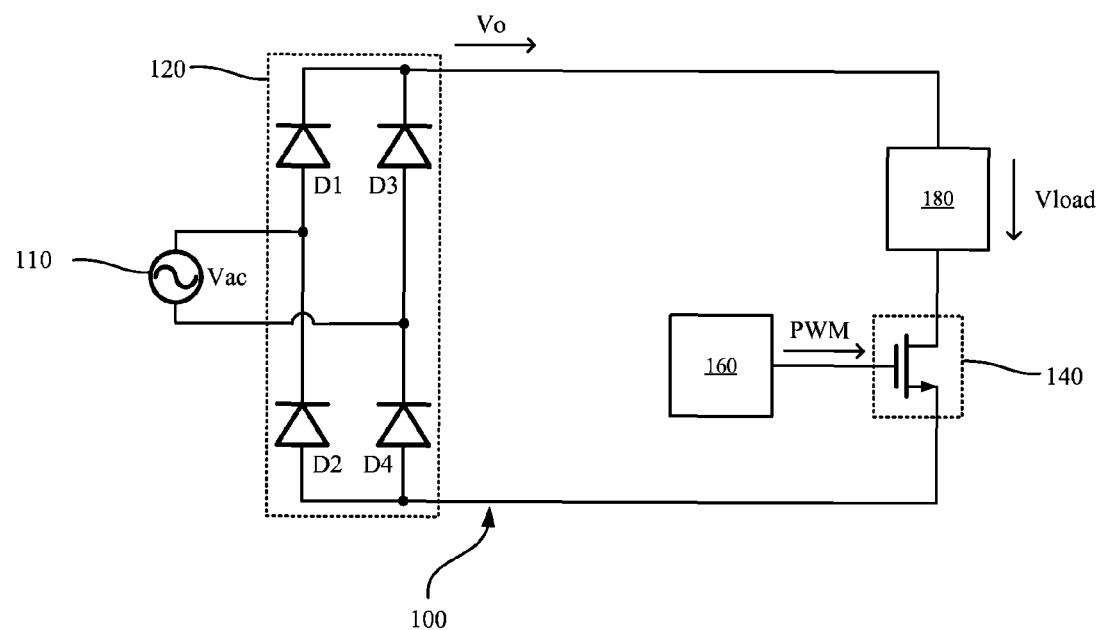
FIG. 1 is a circuit diagram illustrating a dimming circuit according to an embodiment of the present disclosure.

One aspect of the present disclosure is a dimming circuit. Reference is made to FIG. 1. FIG. 1 is a circuit diagram illustrating a dimming circuit 100 according to an embodiment of the present disclosure. The dimming circuit 100 is electrically connected between an AC power source 110 and a lighting module 180, and may be configured to adjust the brightness of the lighting module 180. Specifically, the dimming circuit 100 includes a rectifier circuit 120, a switch unit 140 and a control unit 160. The rectifier circuit 120 is electrically connected to the AC power source 110. The switch unit 140 is electrically connected between the rectifier circuit 120 and the lighting module 180. The control unit 160 is electrically connected to the switch unit 140.

The rectifier circuit 120 is configured to convert an AC voltage signal Vac outputted by the AC power source 110 to a rectified voltage signal Vo, which is to provide to the lighting module 180. For example, in one embodiment, the rectifier circuit 120 may be implemented by a bridge rectifier including diodes D1, D2, D3, and D4, in which the negative terminals of the diodes D1 and D3 are connected to the lighting module 180, and the positive terminals of the diodes D2 and D4 are connected to the lighting module 180. It is noted that the rectifier circuit 120 may be implemented in a variety of ways, and the bridge rectifier illustrated in FIG. 1 is only by example and not meant to limit the present disclosure.

In an embodiment of the present disclosure, the lighting module 180 may include a driving circuit 182 and a light emitting diode (LED) 184 (see FIG. 3), in which the driving circuit 182 is configured to drive the light emitting diode 184 for illumination. The brightness of the light emitting diode 184 is determined by a terminal voltage $V_{load}$ of the lighting module 180.

The switch unit 140 is switched according to a pulse width modulation signal PWM to connect or disconnect the rectifier circuit 120 and the lighting module 180. In an embodiment, the switching unit 140 may be implemented by a metal-oxide-semiconductor, such as an N-type metal-oxide-semiconductor (NMOS), in which the gate terminal of the NMOS is connected to the control unit 160, the drain terminal of the NMOS is connected to the lighting module 180, and the source terminal of the NMOS is connected to the positive terminals of the diode D2 and the diode D4 in the rectifier circuit 120. However, such a configuration is not meant to limit the switch unit 140 of the present disclosure.

In an embodiment of the present disclosure, when the pulse width modulation signal PWM is at a high level, the switch unit 140 is ON such that the circuit formed with the rectifier circuit 120 and the lighting module 180 is complete, and in this state, a load current flows to the lighting module 180. On the other hand, when the pulse width modulation signal PWM is at a low level, the switch unit 140 is OFF such that the circuit formed with the rectifier circuit 120 and the lighting module 180 is incomplete, and in this state, no load current will flow to the lighting module 180. Alternatively stated, when no complete circuit is formed with the rectifier circuit 120 and the lighting module 180, the terminal voltage $V_{load}$ of the lighting module 180 is zero and no voltage difference is generated. On the other hand, when a complete circuit is formed with the rectifier circuit 120 and the lighting module 180, the terminal voltage $V_{load}$ of the lighting module 180 is determined by the rectified voltage signal Vo. Since a complete circuit is formed or not formed with the rectifier circuit 120 and the lighting module 180 according to the switching of the pulse width modulation signal PWM, the terminal voltage $V_{load}$ of the lighting module 180 is a pulse voltage signal controlled by pulse width modulation, and thus the load current flowed through the lighting module 180 is a pulse current controlled by pulse width modulation.

Figure 2:
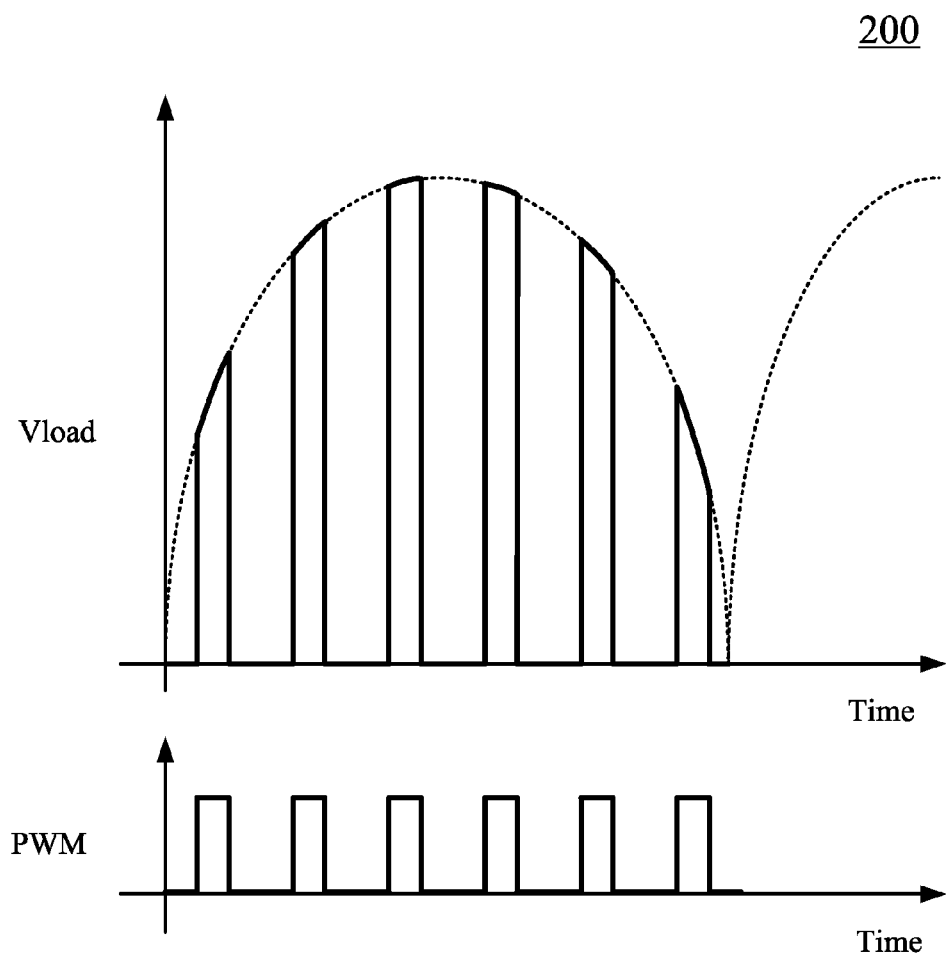
FIG. 2 is a waveform diagram illustrating waveforms of a terminal voltage of a lighting module and of a pulse width modulation signal according to an embodiment of the present disclosure.

Additional reference is made to FIG. 2. FIG. 2 is a waveform diagram illustrating waveforms of the terminal voltage $V_{load}$ of the lighting module 180 and the pulse width modulation signal PWM according to an embodiment of the present disclosure. As shown in FIG. 2, when the pulse width modulation signal PWM is at the low level, the terminal voltage $V_{load}$ of the lighting module 180 is zero. On the other hand, when the pulse width modulation signal PWM is at the high level, the terminal voltage $V_{load}$ of the lighting module 180 is positively correlated to the rectified voltage signal Vo.

For example, in an embodiment, the frequency of the AC voltage signal Vac outputted by the AC power source may be 60 Hz, and the rectifier circuit 120 is configured to convert the AC voltage signal Vac to the rectified voltage signal Vo with a frequency of 120 Hz. In one cycle of the rectified voltage signal Vo, the pulse width modulation signal PWM is switched between the high level and the low level in a higher switching frequency (e.g., 10 kHz) to form or not form a complete circuit with the rectifier circuit 120 and the lighting module 180. Since the variation frequency of the terminal voltage $V_{load}$ of the lighting module 180 and the variation frequency of the load current flowed through the lighting module 180 are determined according to the switching frequency of the switch unit 140, and the variation frequency of the terminal voltage $V_{load}$ of the lighting module 180 is much higher than the range that can be perceived by human eyes, the light source of the lighting module 180 observed by users is a stable light source and no flashing is perceived.

The pulse width modulation signal PWM is generated by the control unit 160. In practice, the control unit 160 may be implemented by a microcontroller unit (MCU), a digital signal processors (DSP), a field-programmable gate array (FPGA), etc. The control unit 160 may adjust the duty cycle of the pulse width modulation signal PWM, or alternatively stated, the control unit 160 may adjust the time ratio of the pulse width modulation signal PWM at the high level in one complete cycle. When the duty cycle of the pulse width modulation signal PWM is large, the time of the pulse width modulation signal PWM at the high level is made longer, and the time of the rectifier circuit 120 and the lighting module 180 being ON is also made longer, and thus the terminal voltage $V_{load}$ of the lighting module 180 on average in one cycle is made higher.

On the other hand, when the duty cycle is small, the time of the pulse width modulation signal PWM at the high level is made shorter, and the time of the rectifier circuit 120 and the lighting module 180 being ON is made shorter, and thus the terminal voltage $V_{load}$ of the lighting module 180 on average in one cycle is made lower. Accordingly, the control unit 160 may adjust the duty cycle of the pulse width modulation signal PWM to adjust the terminal voltage $V_{load}$ of the lighting module 180 to achieve the dimming of the lighting module 180.

In the case where the pulse width modulation signal PWM does not achieve synchronous correction in compliance with the rectified voltage signal Vo, during the different cycles, the brightness of the lighting module 180 is not stable. This is due to the fact that though the duty cycle of the pulse width modulation signal PWM does not change, the waveform of the terminal voltage $V_{load}$ of the lighting module 180 in different cycles will not be exactly the same when the pulse width modulation signal PWM is not synchronized with the rectified voltage signal Vo. An error in the average value of the terminal voltage $V_{load}$ of the lighting module 180 in a cycle is present, and this error causes the brightness of the lighting module 180 to be varied in different cycles and flickering of the light source.

To solve this problem, the dimming circuit may further include a voltage detecting unit to control the synchronization of the pulse width modulation PWM and the rectified voltage signal Vo in each cycle to prevent flickering of the light source caused by the pulse width modulation signal PWM being at the high level when the rectified voltage signal Vo is zero.

Figure 3:
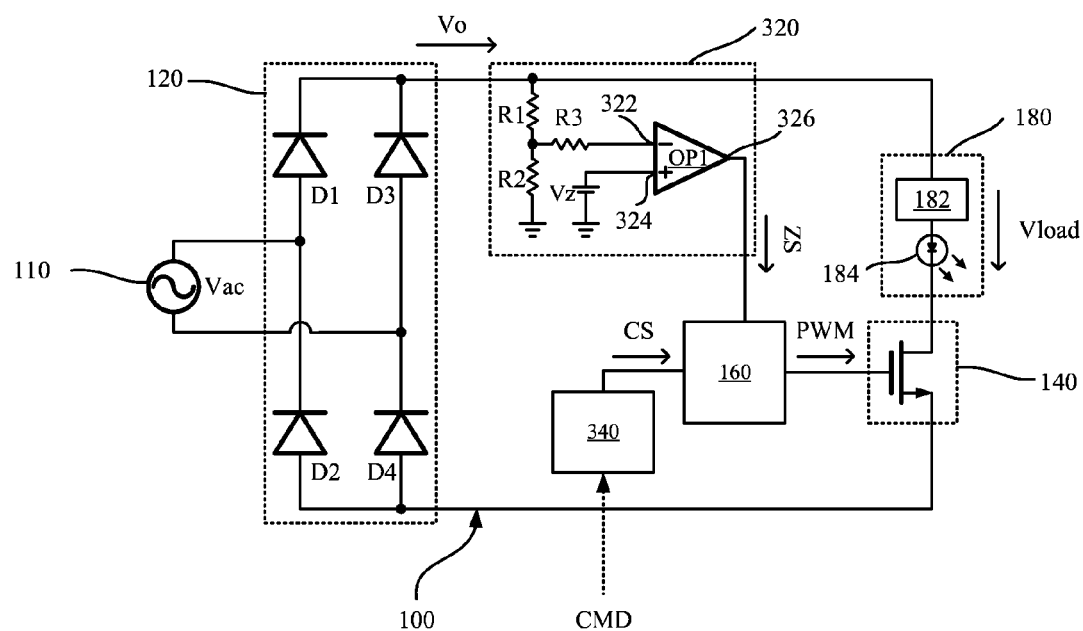
FIG. 3 is a circuit diagram illustrating a dimming circuit according to an embodiment of the present disclosure.

Reference is made to FIG. 3. FIG. 3 is a circuit diagram illustrating a dimming circuit according to another embodiment of the present disclosure. In the present embodiment, the dimming circuit 100 further includes a voltage detecting unit 320 and a receiving module 340.

The voltage detecting unit 320 is electrically connected to the rectifier circuit 120 and the control unit 160. Specifically, the voltage detecting unit 320 is configured to detect the rectified voltage signal Vo outputted by the rectifier circuit 120 and to output a detecting signal ZS to the control unit 160, and the phase synchronization of the pulse width modulation PWM and the rectified voltage signal Vo is achieved by the detecting signal ZS. The specific operation will be explained with the embodiment shown in FIG. 4 in conjunction with the embodiment shown in FIG. 3.

In an embodiment, the voltage detecting unit 320 may further be a zero voltage detecting unit configured to output the detecting signal ZS to the control unit 160 when the rectified voltage signal Vo is substantially zero.

Figure 4:
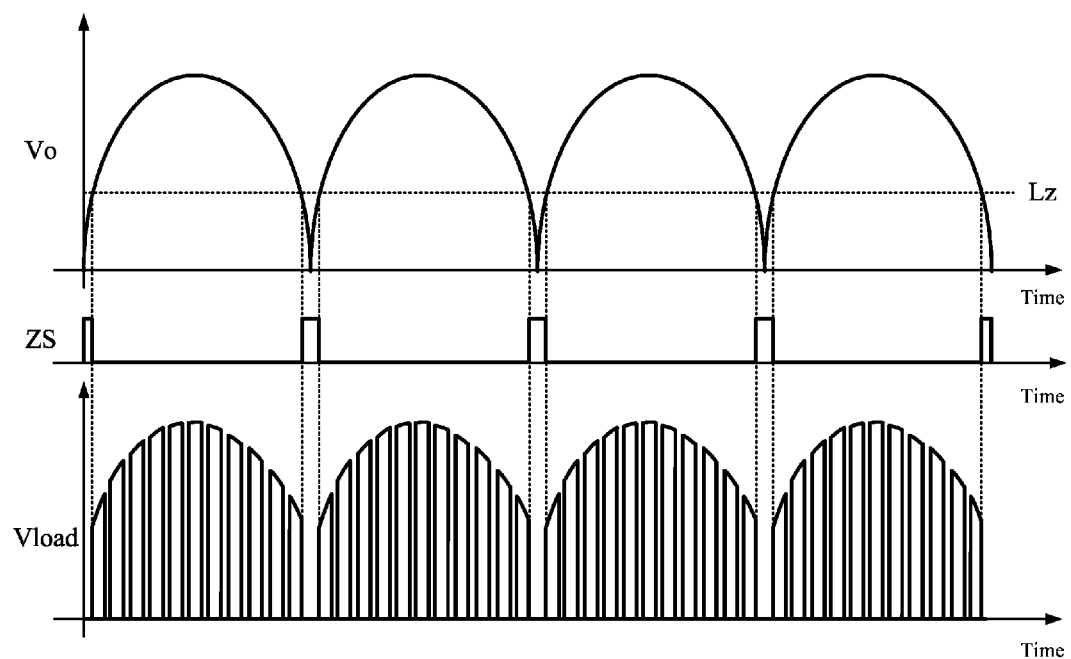
FIG. 4 is a waveform diagram illustrating waveforms of a terminal voltage of a lighting module, a rectified voltage signal, and a detecting signal according to an embodiment of the present disclosure.

Reference is made to FIG. 4. FIG. 4 is a waveform diagram illustrating waveforms of the terminal voltage $V_{load}$ of the lighting module 180, the rectified voltage signal Vo, and the detecting signal ZS according to an embodiment of the present disclosure. As shown in FIG. 4, when the level of the rectified voltage signal Vo detected by the voltage detecting unit 320 is lower than a predetermined level (e.g., predetermined level Lz), the voltage detecting unit 320 is configured to output the detecting signal ZS to the control unit 160. When the control unit 160 receives the detecting signal ZS, the control unit 160 is configured to stop outputting the pulse width modulation signal PWM and controls the switch unit 140 to be OFF to disconnect the rectifier circuit 120 and the lighting module 180. Alternatively stated, when the level of the rectified voltage signal Vo is lower than the predetermined level Lz, the terminal voltage $V_{load}$ of the lighting module 180 is zero.

In the next cycle, until the voltage detecting unit 320 detects the level of the rectified voltage signal Vo is higher than the predetermined level Lz, the voltage detecting unit 320 stops outputting the detecting signal ZS (the detecting signal ZS is at the relatively low level as shown in FIG. 4), and the control unit 160 is configured to output the pulse width modulation signal PWM once again according to the configured duty cycle.

If the set duty cycle remains constant, because in each cycle, the pulse width modulation signal PWM is switched when the level of the rectified voltage signal Vo is equal to the level of the predetermined level Lz, the waveform of the terminal voltage $V_{load}$ of the lighting module 180 in each cycle remains the same and no aforementioned error is present; therefore, flickering of the light source may be improved.

The voltage detecting unit 320 may be implemented in various ways. For example, as shown in FIG. 3, the voltage detecting unit 320 may include a comparator OP1. The comparator OP1 has a first input terminal 322, a second input terminal 324, and an output terminal 326. The first input terminal 322 is configured to receive the rectified voltage signal Vo after a voltage division by a resistor unit R1, a resistor unit R2, and a resistor unit R3. The second input terminal 324 is configured to receive a threshold voltage signal Vz, and the output terminal is configured to output the detecting signal ZS. In the present embodiment, when the divided rectified voltage signal Vo is higher than the threshold voltage signal Vz, the comparator OP1 will not output the detecting signal ZS (the detecting signal ZS is at the relatively low level as shown in FIG. 4). When the divided rectified voltage signal Vo is lower than the threshold voltage signal Vz, the comparator OP1 is configured to output the detecting signal ZS to the control unit 160 (the detecting signal ZS is at the relatively high level as shown in FIG. 4).

As shown in FIG. 3, in other embodiments, the dimming circuit 100 may further include the receiving module 340. The receiving module 340 is electrically connected to the control unit 160. The receiving module 340 is configured to receive an external dimming signal CMD and to output a control signal CS to the control unit 160 according to the external dimming signal CMD. The control unit 160 is configured to adjust the duty cycle of the pulse width modulation signal PWM according to the received control signal CS to thereby control the terminal voltage $V_{load}$ of the lighting module 180.

The receiving module 340 may be configured to receive the external dimming signal CMD via wired or wireless communication. For example, the external dimming signal CMD may be a wireless signal, such as an infrared signal or a radio signal, outputted by a remote controller. Users may send out a corresponding external dimming signal CMD as needed to control the light source to be brighter or darker, or to a saved preconfigured brightness. After receiving the external dimming signal CMD, the receiving module 340 may be configured to output the corresponding control signal CS according to the external dimming signal CMD, such that the control unit 160 is configured to increase or decrease the duty cycle of the pulse width modulation signal PWM in order to adjust the terminal voltage $V_{load}$ of the lighting module 180. Accordingly, users may be able to adjust the terminal voltage $V_{load}$ of the lighting module 180 via remote control to achieve brightness adjustment.

Another aspect of the present disclosure is a solid state light source device. The solid state light source device includes the lighting module 180 and the dimming circuit 100 disclosed in the aforementioned embodiments. The lighting module 180 includes LEDs and the driving circuit configured to drive the LEDs, and therefore, the lighting module 180 may operate independently of the dimming circuit 100 when users do not need a dimming function.

When users need a dimming function, the lighting module 180 may be connected to the dimming circuit 100. The dimming circuit 100 includes the rectifier circuit 120, the switch unit 140, and the control unit 160. Details of the structures and operations among the rectifier circuit 120, the switch unit 140, and the control unit 160 are all fully disclosed and described in the above embodiments, and thus a further explanation is omitted herein for the sake of brevity.

Figure 5:
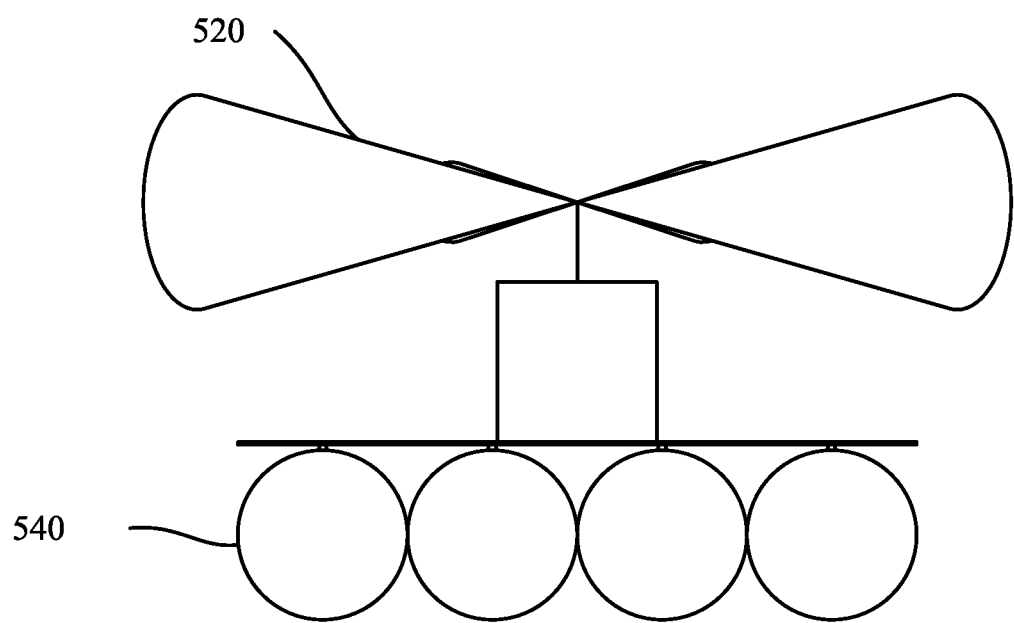
FIG. 5 is a schematic diagram illustrating a ceiling fan light according to an embodiment of the present disclosure.

In an embodiment, the solid state light source device may be a ceiling fan light. Reference is made to FIG. 5. FIG. 5 is a schematic diagram illustrating a ceiling fan light 500 according to an embodiment of the present disclosure. The ceiling fan light 500 includes a fan module 520, a lighting module 540 and control circuits (not shown) thereof, and has both indoor air convection and lighting applications.

The typical ceiling fan light uses a triode for alternating current (TRIAC) to achieve dimming, and uses a separate fan control circuit to control the fan speed in multiple steps (e.g., low speed, medium speed, high speed) by switching the triode. Thus, stepless control of the fan speed is not possible with such a typical configuration.

In the present embodiment, using the dimming circuit 100 disclosed in the above embodiments, not only is the brightness of the lighting module 540 adjusted by adjusting the pulse width modulation signal PWM, but the rotation speed of the fan module 520 is also adjusted by adjusting the pulse width modulation signal PWM to thereby achieve stepless control of the fan speed.

Figure 6:
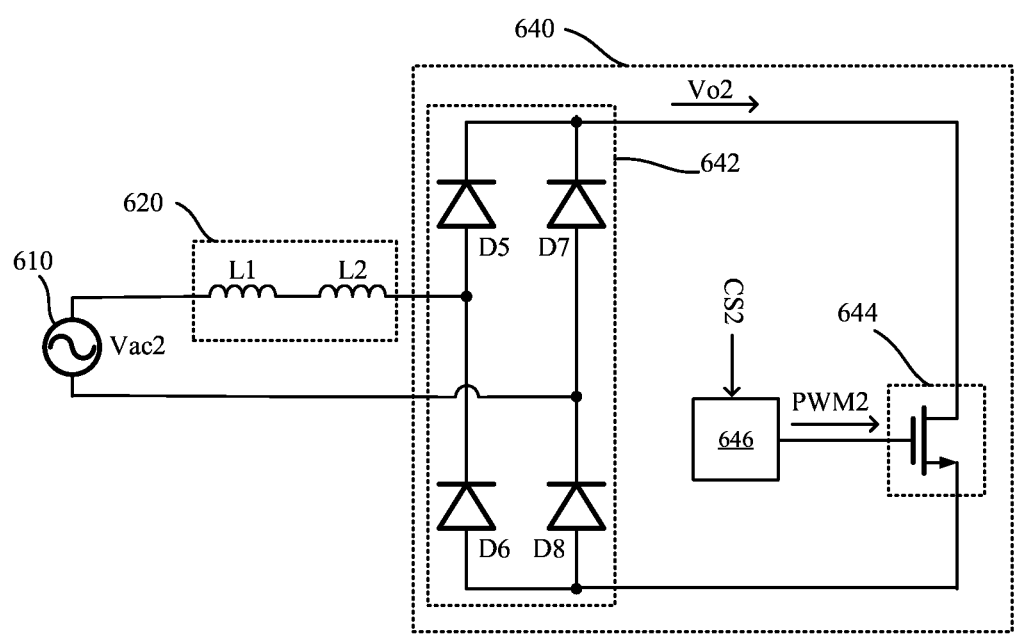
FIG. 6 is a circuit diagram illustrating a motor module and a fan control circuit according to an embodiment of the present disclosure.

Reference is made to FIG. 6. FIG. 6 is a circuit diagram illustrating a motor module 620 and a fan control circuit 640 configured to drive the fan module 520 shown in FIG. 5 according to an embodiment of the present disclosure. As shown in FIG. 6, the motor module 620 is electrically connected to a second AC power source 610, and the fan control circuit 640 is electrically connected to the motor module 620.

The motor module 620 includes a primary winding L1 and a secondary winding L2. The current which flows through the primary winding L1 and the secondary winding L2 of the motor module 620 will affect the rotational speed of the fan. The fan control circuit 640 is configured to control the current flowed through the motor module 620 to achieve the adjustment of the rotational speed of the fan.

The fan control circuit 640 includes a rectifier circuit 642, a switch unit 644 and a control unit 646. The rectifier circuit 642 is electrically connected to the motor module 620. The switch unit 644 is electrically connected to the rectifier circuit 642. The control unit 646 is electrically connected to the switch unit 644.

The rectifier circuit 642 is configured to convert an AC voltage signal Vac2 to a rectified voltage signal Vo2. For example, the rectifier circuit 642 may include a bridge rectifier including diodes D5, D6, D7, and D8. The switch unit 644 is configured to undergo switching according to a pulse width modulation signal PWM2 to thereby connect or disconnect the fan control circuit 640.

The control unit 646 is configured to generate the pulse width modulation signal PWM2 to control the switch unit 644. In some embodiments, the control unit 646 is configured to adjust the duty cycle of the pulse width modulation signal PWM2 according to the received control signal CS2 to thereby control the time that the switch unit 644 connects the fan control circuit 640 in order to control the current flowed through the motor module 620. When the duty cycle of the pulse width modulation signal PWM2 is large, the time the switch unit 644 connects the fan control circuit 640 in one cycle is made longer and thus the average current flowed through the motor module 620 is made larger. On the other hand, when the duty cycle of the pulse width modulation signal PWM2 is small, the time the switch unit 644 connects the fan control circuit 640 in one cycle is made shorter and thus the average current flowed through the motor module 620 is made smaller.

Details of the structures and operations of the motor module 620 and the fan control circuit 640 are similar to the lighting module and the dimming circuit which are fully disclosed and described in the above embodiments, and thus a further explanation is omitted herein for the sake of brevity.

In some embodiments, the fan control circuit 640 may further include the receiving module similar to the embodiment of the dimming circuit. In such embodiments, the receiving circuit is electrically connected to the control unit 646 and configured to receive an external fan speed control signal and output a control signal CS2 to the control unit 646 according to the external fan speed control signal. The control unit 646 is configured to adjust the duty cycle of the pulse width modulation signal PWM2 according to the received control signal CS2.

Similar to the receiving module 340 of the dimming circuit 100 in the abovementioned embodiments, the receiving module in the fan control circuit 640 may be configured to receive the external fan speed control signal via a wired or wireless communication. For example, the external fan speed control signal may be a wireless signal, such as infrared signal or radio signal, outputted by a remote controller.

Accordingly, the current flowed though the motor module 620 may be controlled by adjusting the duty cycle of the pulse width modulation signal PWM2 according to the external fan speed control signal sent by users via a wired or wireless signal to thereby achieve stepless control of the fan speed. When needed, users may increase the fan speed, decrease the fan speed, change the fan speed to a saved preconfigured value, etc.

In summary, according to the embodiments disclosed in the present disclosure, by adjusting the duty cycle of the pulse width modulation signal to selectively connect or disconnect the rectifier circuit and the lighting module, the terminal voltage of the lighting module and the load current flowed in the lighting module are regulated in order to achieve a dimming function. Accordingly, no capacitor is needed to limit the current, such that the power factor of the system may be improved, and the dimming circuit may be applied to various lighting modules to thereby achieve a modularization design in order to simplify circuit control and reduce the costs associated with development.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dimming circuit configured to dim a lighting module, comprising:
   a rectifier circuit configured to convert an AC voltage signal to a rectified voltage signal;
   a switch unit electrically connected between the rectifier circuit and the lighting module and configured to undergo switching according to a pulse width modulation signal to connect or disconnect the rectifier circuit and the lighting module;
   a control unit electrically connected to the switch unit and configured to generate the pulse width modulation signal to control the switch unit; and
   a voltage detecting unit electrically connected to the rectifier circuit and the control unit, and configured to detect the rectified voltage signal outputted by the rectifier circuit and to output a detecting signal to the control unit when the rectified voltage signal is lower than a predetermined level;
   wherein the control unit is configured to control the switch unit to disconnect when the control unit receives the detecting signal;
   wherein the voltage detecting unit is a zero-voltage detecting unit configured to detect the rectified voltage signal and to output the detecting signal to the control unit when the rectified voltage signal is substantially zero.

2. The dimming circuit of claim 1, wherein the voltage detecting unit comprises:
   a comparator comprising a first input terminal, a second input terminal and an output terminal, wherein the first input terminal is configured to receive the rectified voltage signal, the second input terminal is configured to receive a threshold voltage signal and the output terminal is configured to output the detecting signal.

3. The dimming circuit of claim 1, further comprising:
   a receiving module electrically connected to the control unit, and configured to receive an external dimming signal and to output a control signal to the control unit according to the external dimming signal;
   wherein the control unit is configured to adjust a duty cycle of the pulse width modulation signal according to the control signal to control a terminal voltage of the lighting module.

4. A solid state light source device comprising:
   a lighting module;
   a rectifier circuit configured to convert an AC voltage signal to a rectified voltage signal;
   a switch unit electrically connected between the rectifier circuit and the lighting module and configured to undergo switching according to a pulse width modulation signal to connect or disconnect the rectifier circuit and the lighting module;
   a control unit electrically connected to the switch unit and configured to generate the pulse width modulation signal to control the switch unit; and
   a voltage detecting unit electrically connected to the rectifier circuit and the control unit, and configured to detect the rectified voltage signal outputted by the rectifier circuit and to output a detecting signal to the control unit when the rectified voltage signal is lower than a predetermined level;
   wherein the control unit is configured to control the switch unit to disconnect when the control unit receives the detecting signal;
   wherein the voltage detecting unit is a zero-voltage detecting unit configured to detect the rectified voltage signal and to output the detecting signal to the control unit when the rectified voltage signal is substantially zero.

5. The solid state light source device of claim 4, wherein the lighting module comprises a driving circuit and at least one light emitting diode, and the driving circuit is configured to drive the at least one light emitting diode.

6. The solid state light source device of claim 4, further comprising:
   a motor module electrically connected to a second AC power source, wherein the motor module comprises a primary winding and a secondary winding; and
   a fan control circuit electrically connected to the motor module, and configured to control the current flowed through the motor module, wherein the fan control circuit comprises:
      a second rectifier circuit configured to convert a second AC voltage signal to a second rectified voltage signal;
      a second switch unit electrically connected to the second rectifier circuit, and configured to undergo switching according to a second pulse width modulation signal to connect or disconnect the fan control circuit; and
      a second control unit electrically connected to the second switch unit, and configured to generate the second pulse width modulation signal to control the second switch unit.

7. The solid state light source device of claim 4, further comprising:
   a receiving module electrically connected to the control unit, and configured to receive an external dimming signal and to output a control signal to the control unit according to the external dimming signal;
   wherein the control unit is configured to adjust a duty cycle of the pulse width modulation signal according to the control signal to control a terminal voltage of the lighting module.

* * * * *